United States Patent [19]
Hirosawa et al.

[11] Patent Number: 5,504,880
[45] Date of Patent: Apr. 2, 1996

[54] METHOD AND APPARATUS FOR MONITORING COMMUNICATION BETWEEN A COMPUTER AND PLURAL CONSOLE DEVICES INCLUDING ONE MAIN CONSOLE DEVICE AND PLURAL SUB-CONSOLES

[75] Inventors: Toshio Hirosawa, Machida; Jun'ichi Kurihara, Mitaka; Ikuo Kimura, Yamato, all of Japan

[73] Assignee: Hitachi, Ltd., Tokyo, Japan

[21] Appl. No.: 503,815

[22] Filed: Apr. 3, 1990

[30] Foreign Application Priority Data

Apr. 7, 1989 [JP] Japan ......................... 1-86805

[51] Int. Cl.⁶ .................................... G06F 11/30
[52] U.S. Cl. .................. 395/180; 395/200.01; 395/280
[58] Field of Search ................... 364/200 MS File, 364/900 MS File; 395/650, 575, 325, 200

[56] References Cited

U.S. PATENT DOCUMENTS

| | | | |
|---|---|---|---|
| 3,906,454 | 9/1975 | Martin | 395/575 |
| 3,980,839 | 9/1976 | Hutcheson | 395/575 |
| 4,449,181 | 5/1984 | Young et al. | 364/200 |
| 4,547,851 | 10/1985 | Kurland | 364/900 X |
| 4,695,946 | 9/1987 | Andreasen et al. | 395/575 |
| 4,701,845 | 10/1987 | Andreasen et al. | 395/575 |
| 4,855,899 | 8/1989 | Presant | 364/200 |
| 4,862,350 | 8/1989 | Orr et al. | 364/200 |
| 4,873,631 | 10/1989 | Nathan et al. | 364/200 X |
| 4,926,375 | 5/1990 | Mercer et al. | 364/900 |
| 4,930,093 | 5/1990 | Houser et al. | 364/900 X |
| 4,972,367 | 11/1990 | Burke | 395/575 |

FOREIGN PATENT DOCUMENTS 59-14054  7/1984  Japan.

Primary Examiner—Kevin A. Kriess
Attorney, Agent, or Firm—Fay, Sharpe, Beall, Fagan, Minnich & McKee

[57] ABSTRACT

Method and system for identifying history of console devices capable of rapidly analyzing and determining a factor of obstacle of a computer system due to misoperation of a console device in the computer system comprising at least one central processing unit including a computer, a main console device connected thereto and a plurality of sub-console devices for controlling the operation of the computer. History of the console devices as to which one of the sub-console devices command data has been issued from and/or which one of the sub-console devices command data has been sent to is examined to analyze and determine the factor of computer system obstacle.

27 Claims, 12 Drawing Sheets

FIG. 2

CTAB 110

| DEVICE ADDRESS | NMEMONIC | TYPE | ATTRIBUTE | IDENTIFICATION INFORMATION | NUMBER OF REGISTERED ENTRIES |
|---|---|---|---|---|---|
| | | | | | |
| 001 | C00 | N | M | MASTER | |
| 009 | C02 | N | S | SUB-CON 1 | |
| 010 | C03 | P | S | SUB-CON 2 | |
| | | | | | |
| 040 | C09 | N | R | REMOTE 3 | |
| 047 | C10 | P | R | REMOTE 4 | |

ATTRIBUTE FIELD

M ··· MAIN CONSOLE DEVICE
S ··· SUB-CONSOLE DEVICE
R ··· REMOTE CONSOLE DEVICE

TYPE FIELD

N ··· WITHOUT DATA PROCESSING CAPABILITY
P ··· WITH DATA PROCESSING CAPABILITY

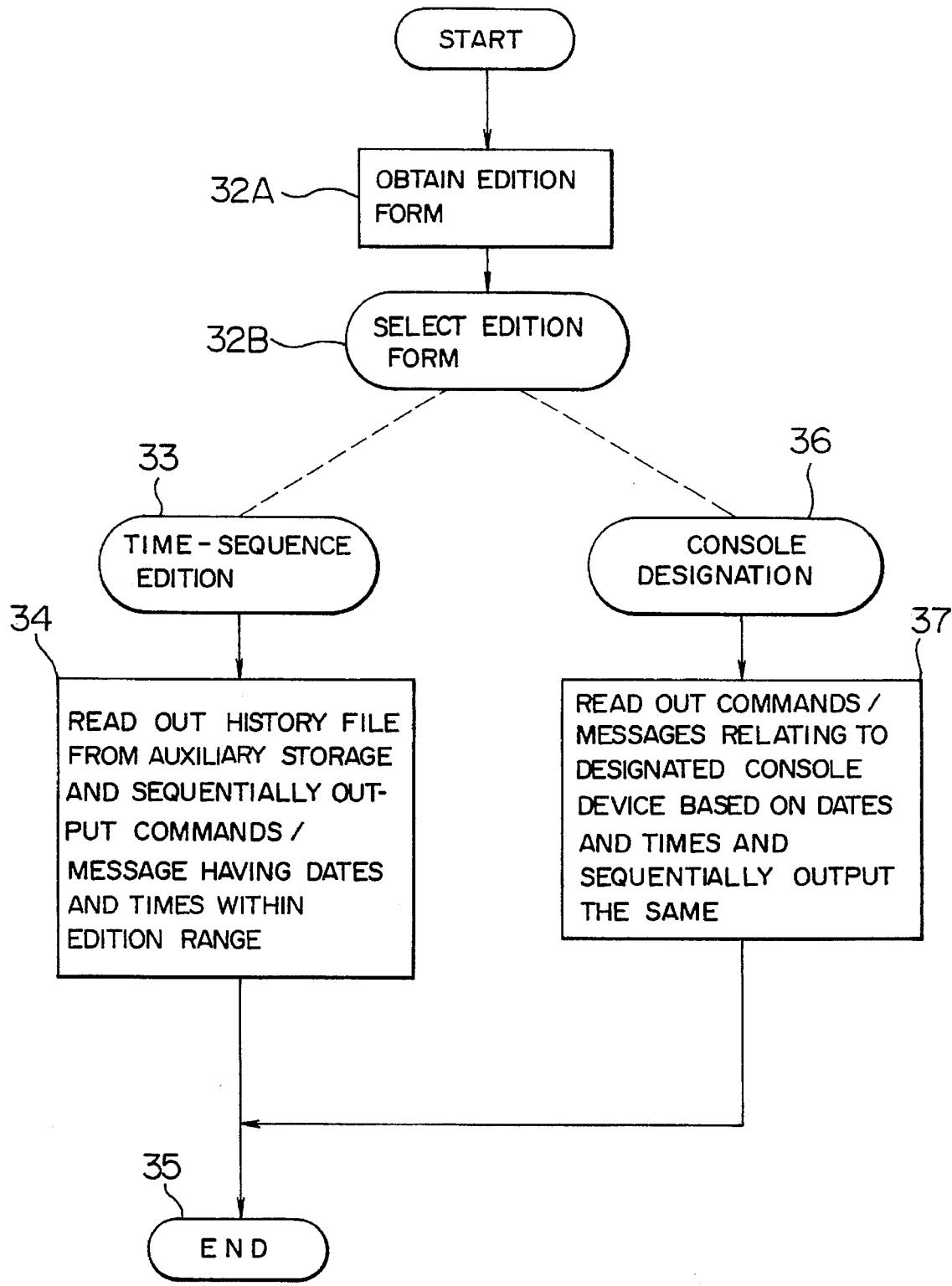

METHOD AND APPARATUS FOR MONITORING COMMUNICATION BETWEEN A COMPUTER AND PLURAL CONSOLE DEVICES INCLUDING ONE MAIN CONSOLE DEVICE AND PLURAL SUB-CONSOLES

BACKGROUND OF THE INVENTION

The present invention relates to a control system for identifying a console device which issues command data and a console device which receives message data in an information processing system having a plurality of console devices for controlling an operation of a computer, and more particularly to a control method, processing method and processing system suitable in function and use when history of issuance of command data and history of display output of message data for each console device are to be obtained.

The term console device used herein means a device which effects communication between an operator and a computer in order to control the operation of the computer and it is different from a terminal device which merely inputs or receives data.

As an application field of a computer system or an information processing system expands, a configuration of the information processing system (which is hereinafter also referred to as the computer system) becomes complex, and an improvement of reliability of the computer system is an important task to be achieved. As an approach to improve the reliability of the computer system, a control system which has two console devices, one for current use and the other for spare, for controlling the operation of the computer system and switches the current use console device to the spare console device is disclosed in JP-A-59-14054. In the control system disclosed in JP-A-59-14054, the current use console device (service processor SUP) and the spare console device are provided, and while the current use console device is in operation, an inhibit signal (IH signal) from the current use console device to the spare console device is set to "1" to logically disconnect a data bus of the spare console device. When switching is made from the current use console device to the spare, the IH signal is set to "0" to logically switch the data bus. In this manner, the switching from the current use to the spare is made instantly.

The prior art technique disclosed in JP-A-59-14054 relates to a control system in which the switching to the single console device provided as the spare is made instantly when an obstacle occurs in the currently used single console device (which can control the computer). In the prior art system, only one of the current use and spare console devices may be used and a plurality of console devices cannot be effectively used.

On the other hand, there has been the following desire on the part of users. As the application field of the computer system expands, the configuration of the computer system becomes complex and the improvement in the operability and reliability is essential. One specific approach to improve the operability and reliability of the computer system is to prepare a plurality of console devices to control the operation of the computer system in such a manner that any console device may issue a data stream of command data for controlling the system. By operating the plurality of console devices simultaneously, it is possible to 1) control the computer system by other console device even if a main console device steps to operate by an obstacle, and 2) control the computer system from geographically distributed locations.

Thus, the reliability of the computer system, particularly, anti-obstacle property for the obstacle of the console device is enhanced. The operability of the computer system is also improved because operators of the computer system may issue commands to the computer system from different locations.

On the other hand, when a plurality of console devices are connected to the computer system, a factor to lower the reliability of the overall computer system, specifically, a factor to induce the halt of the operation of the computer system due to misoperation, increases. Namely, while the anti-obstacle property of the console device is enhanced and the operability is improved, the factor of misoperation of the computer system also increases. Whether the computer operator is an expert or an unexperienced person, there is a risk for inducing the misoperation. In order to centrally control the computer system, it is necessary for a main operator at a main console device to monitor what command has been issued by each of the console devices. It is also necessary to centrally refer history of communication of command data and message data between the console devices and the computer system. Where a plurality of console devices are connected, it is a problem to be solved to provide a support function to immediately locate the console device if it has issued the command data which would induce malfunction. In order to attain the advantage of the multiple console devices, it is necessary to solve those problems.

SUMMARY OF THE INVENTION

It is an object of the present invention to provide method and system for identifying history of console devices in an information processing system having a plurality of sub-console devices capable of controlling an operation of a computer, in which history of each console device such as a particular sub-console device which has issued command data and/or a particular sub-console device which is to receive command data, is identified to permit rapid analysis and determination of a factor of obstacle of the computer system by misoperation of the console device.

It is another object of the present invention to provide control means in an information processing system or computer system having a plurality of console devices connected thereto, which automatically adds identification information of a console device when the console device has issued a data stream of command data, and displays it on a main console device and stores it in an auxiliary storage.

It is another object of the present invention to provide control means in a computer system having a plurality of console devices connected thereto, which automatically adds identification information to a console device when message data is sent to the console device from a processing program in the computer system, and displays it on a main console device and stores it in an auxiliary storage.

It is another object of the present invention to provide control means which automatically adds identification information of a console device when the console device has issued a data stream of command data, displays it on a main console device and stores it in an auxiliary storage, transfers the command data to a processing program in the computer system, removes the added identification information and delivers the command data.

It is another object of the present invention to provide control means which edits the command data and message data stored in the auxiliary storage, sequentially and for each console device, and displays and outputs it.

In order to achieve the above objects, a control mechanism which realizes the console control system of the information processing system is provided between the processing program in the information processing system or the computer system and each of the console devices to monitor the command data and message data to and from the computer system. The control system of the present invention is provided with an association table of device addresses and attributes of the console devices and the identification information. When command data is issued, the association table is looked up to locate an entry corresponding to the console device. Identification information is derived from the entry and it is added to the data stream of the command data, and it is displayed on the main console device and stored in the auxiliary storage. In the present invention, a work area for the above processing is secured separately from a conventional console buffer. When the command data is to be delivered to the processing program in the computer system, the content of the console buffer is delivered. When the console buffer is shared with the work area, the added identification information is removed from the data stream before the data stream of the command data is delivered to the processing program in the computer system.

On the other hand, when the message data is outputted, the entry corresponding to the destination console device is looked up by the association table to obtain the identification information. Then, the identification information is added to the data stream of the message data, and it is displayed on the main console device and stored in the auxiliary storage. After the message data has been outputted to the console device it may not be necessary to add the identification information to the data stream of the message data, and display it on the main console device and store it in the auxiliary storage. The operation of the present invention is not impeded even if the sequence of the above operations is changed.

Where the console devices have the data processing capability, there is provided control means which automatically adds a delimiter and identification information of the console device following to the data stream of the command data entered by the operator, and transfers them to the information processing system or computer system. The control mechanism of the present invention in the computer system looks up the association table to locate the entry corresponding to the console device and recognizes that the console device has the data processing capability based on the attribute information in the entry. The identification information is derived from the entry and it is added to the data stream of the command data, and it is displayed on the main console device and stored in the auxiliary storage. Then, the data stream behind the delimiter is deleted and the data stream of the command data is delivered to the processing program in the computer system.

Further, the command data and message data stored in the auxiliary storage are subsequently edited sequentially and for each console device and they are displayed and outputted by the control means. The command data and message data stored in the auxiliary storage are sequentially accessed, edited into a desired form and outputted to an output device such as a display device or a line printer. It operates in the computer system or in the main console device having the data processing capability.

The console control system of the information processing system of the present invention operates between the processing of receiving the command data sent from the console device, by the computer system or sending the message data by the computer system, and an input/output supervisor (IOS), and adds the identification information as required while it monitors the communication of the command data and message data. When the data stream of the command data is to be delivered to the processing program in the computer system, the added identification information is not delivered. Therefore, it is not necessary to significantly change the existing operating system or modify the processing program, and the misoperation is avoided.

BRIEF DESCRIPTION OF THE DRAWINGS

FIG. 2 shows a chart of a console device association table 110 shown in FIG. 1;

FIG. 12 shows a process flow of an edition output program 235 shown in FIG. 1.

DESCRIPTION OF THE PREFERRED EMBODIMENTS

Figure 1:
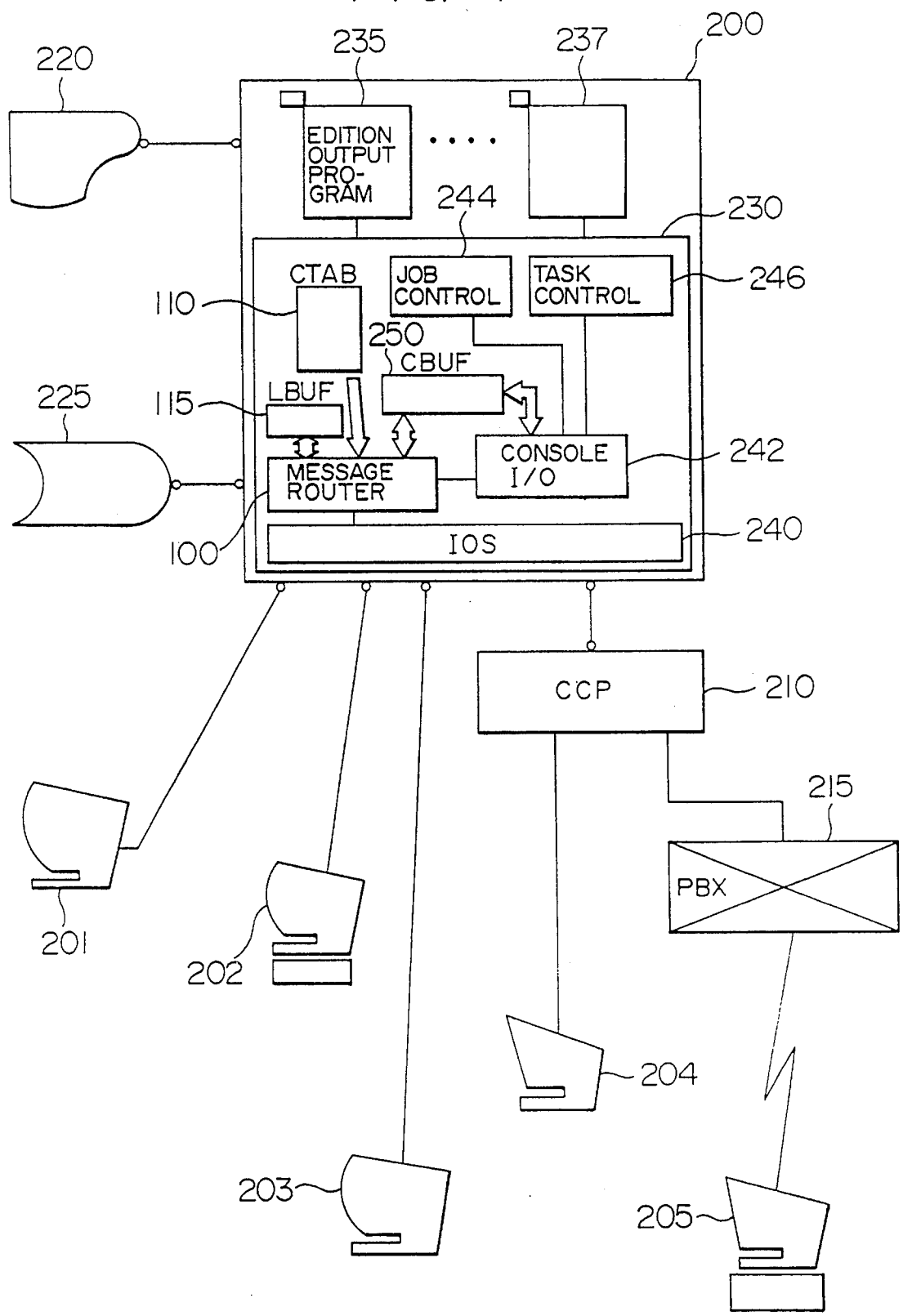
FIG. 1 shows a block diagram of a console control system of an information processing system of the present invention.

Embodiments of the present invention are now explained with reference to FIGS. 1–12. FIG. 1 shows a configuration of a console control system of an information processing system of the present invention. Numeral denotes the information processing system or computer system which comprises an execution unit and a main storage. Numeral 210 denotes a communication control processor (CCP), numeral 215 denotes a line exchange (PBX), numeral 220 denotes an output device such as a line printer, and numeral 225 denotes an auxiliary storage which stores history of data streams of command data and message data. Numerals 201–205 denote console devices connected to the computer system 200, numeral 201 denotes a main console device located near the computer system 200, numeral 202 denotes an auxiliary console device having data processing capability, numeral 203 denotes a conventional auxiliary console device, and numerals 204 and 205 denote remote auxiliary console devices connected through the CCP 210. The auxiliary console device 205 also has the data processing capability.

An operating system (OS) 230 operates under the computer system 200, and application programs 235–237 operate under the control of the OS 230. The application program 235 has a function to edit and output history of the command data and message data stored in the auxiliary storage 225, as characterized by the present invention. The OS 230 includes an input/output supervisor (IOS) 240, a console input/output processing program 242, a job control program 244, a task control program 246 and a console buffer (CBUF) 250. In the prior art system, the content of the CBUF 250 is sent to the console devices 201– 205 through the IOS 240 or the data from the console devices 201–205 is delivered to the console I/O processing program 242 through the CBUF 250. On the other hand, in the console control system of the information processing system of the present invention, a control mechanism 100 called a message router, a console table (CTAB) 110 and a logging buffer (LBUF) 115 are provided in addition to the conventional OS. Accordingly, the command data and the message data in the CBUF 250 are communicated with the console devices 201–205 through the message router 100. The LBUF 115 is used when the command data is to be displayed on the main console device or the command data or the message data is to be stored in the auxiliary storage 225 as history information.

Figure 3:
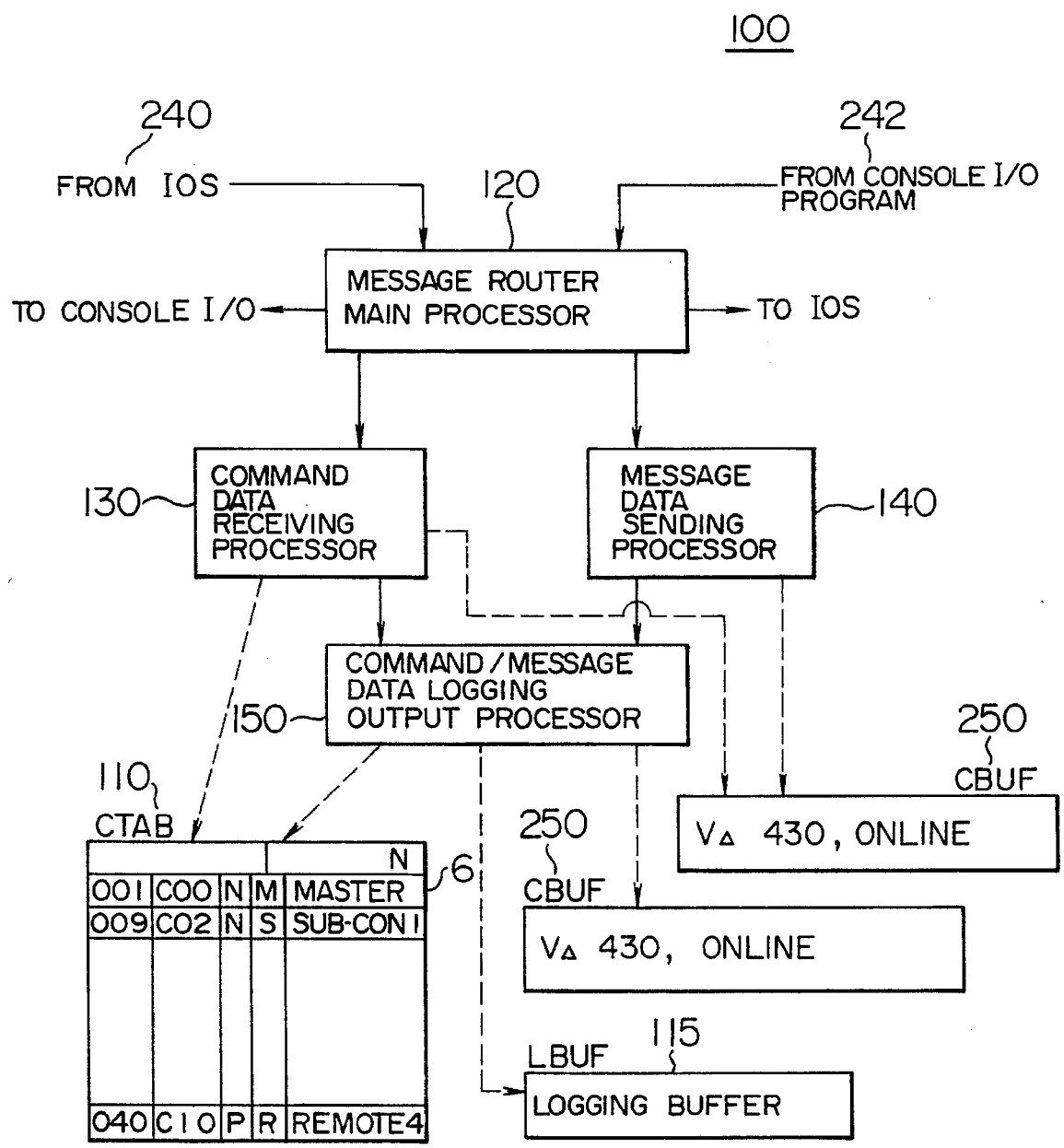
FIG. 3 shows a block diagram of processing programs of a message router shown in FIG. 1.
Figure 4:
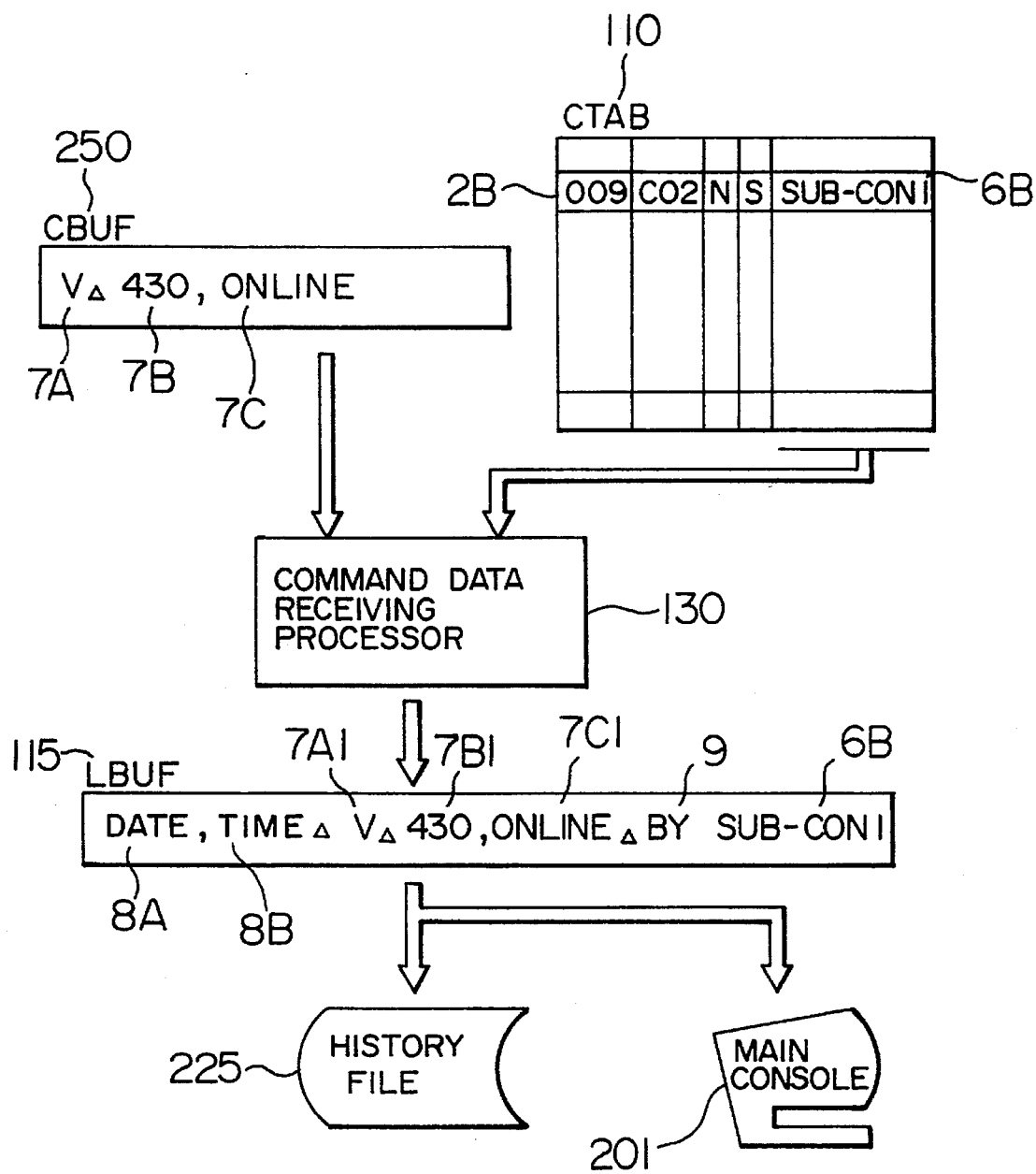
FIGS. 4 and 5 illustrate processes when data streams of command data are received from console devices 2001-205.
Figure 5:
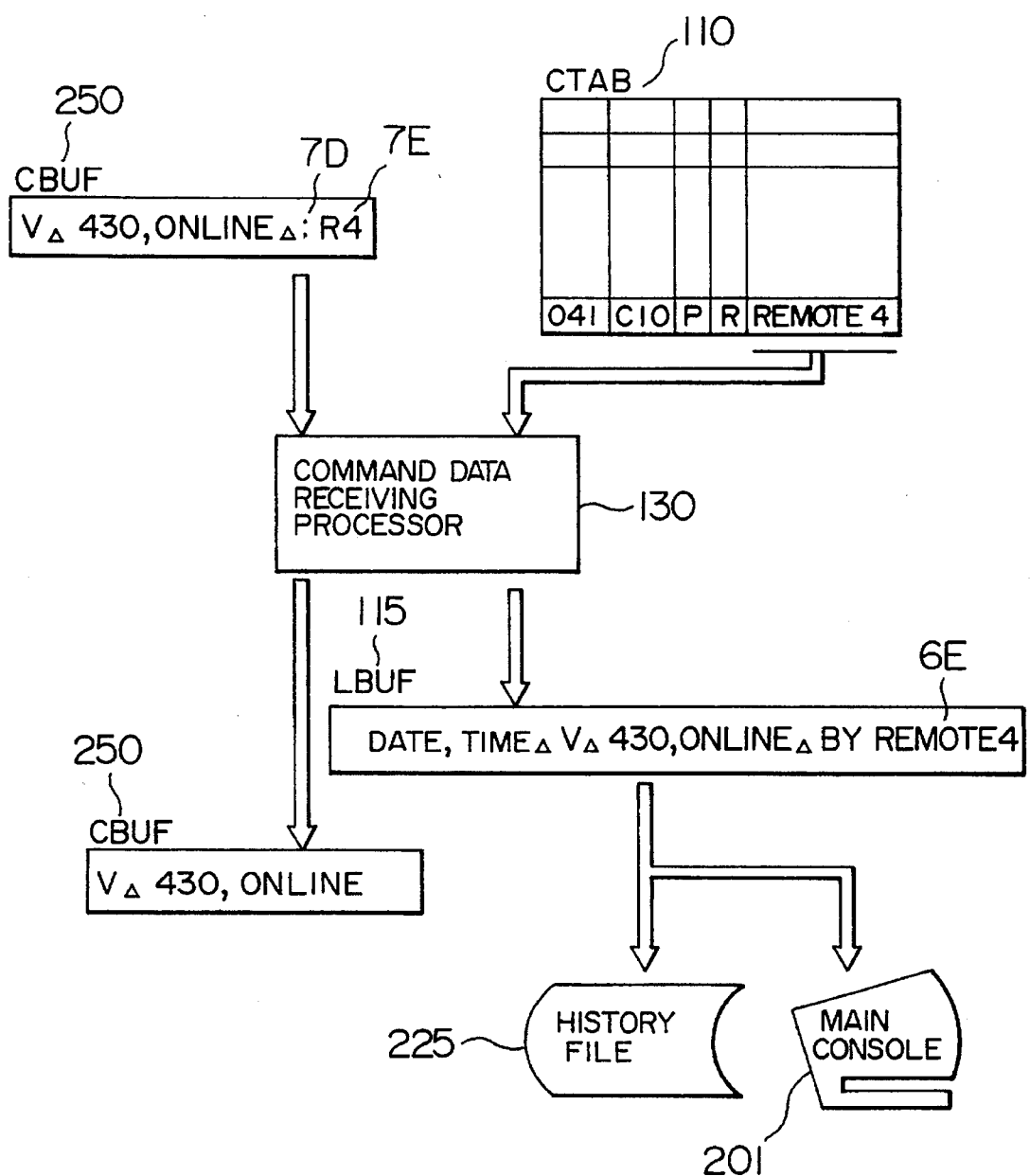
Figure 6:
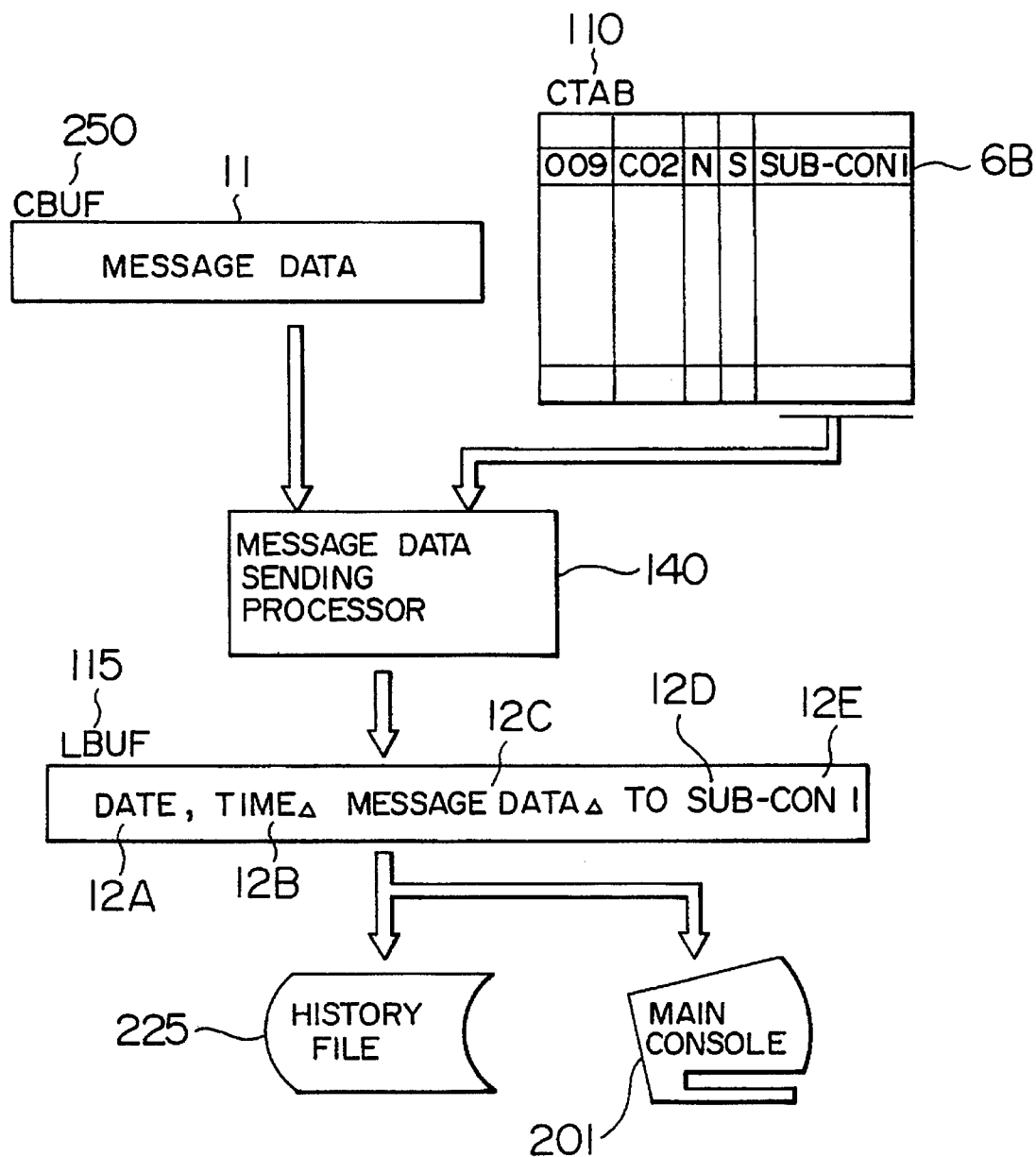
FIG. 6 illustrates a process when data streams of message data are sent to the console devices 201-205.
Figure 7:
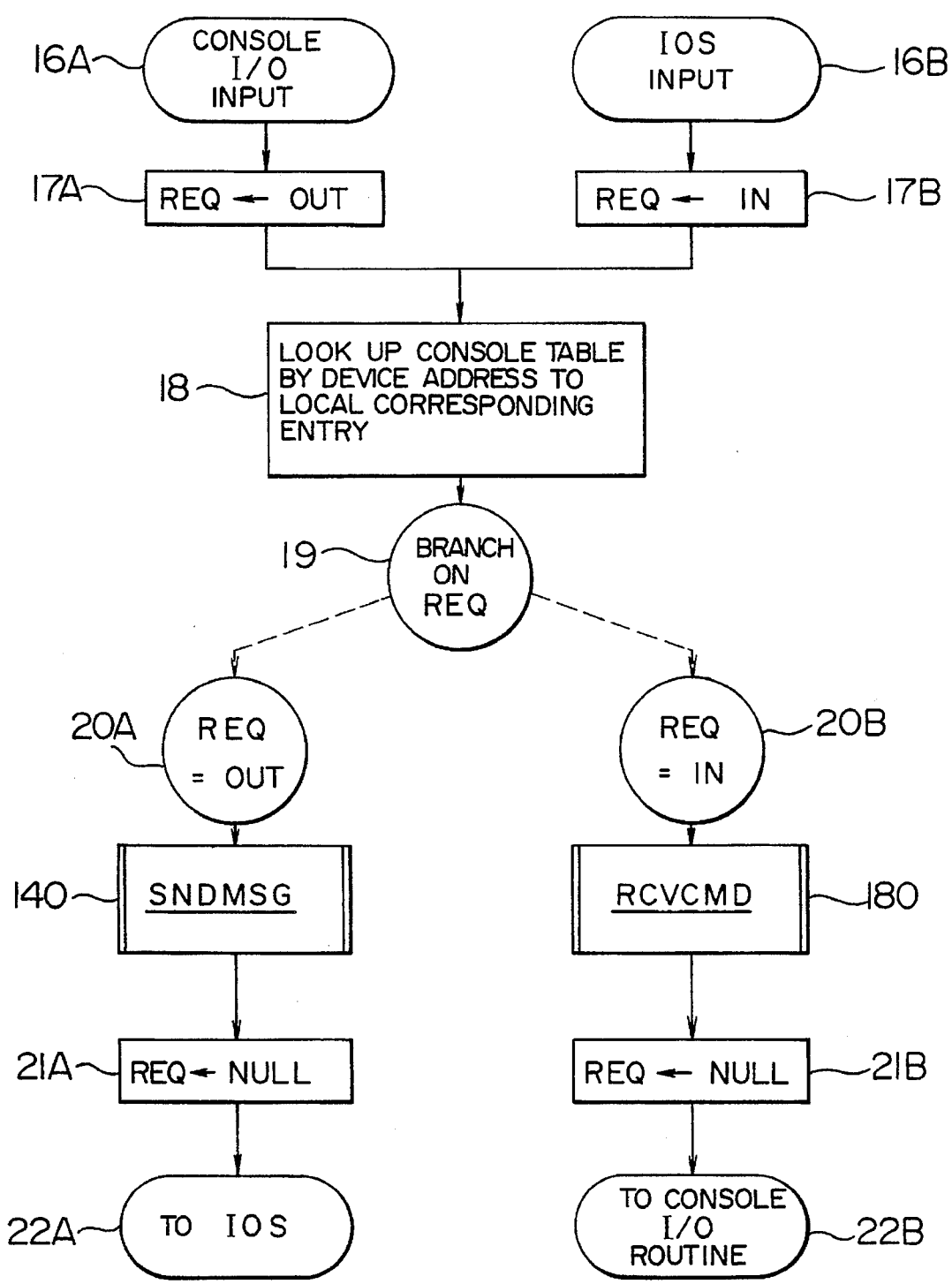
FIG. 7 shows a process flow of a message router main processor 120 shown in FIG. 3.
Figure 8:
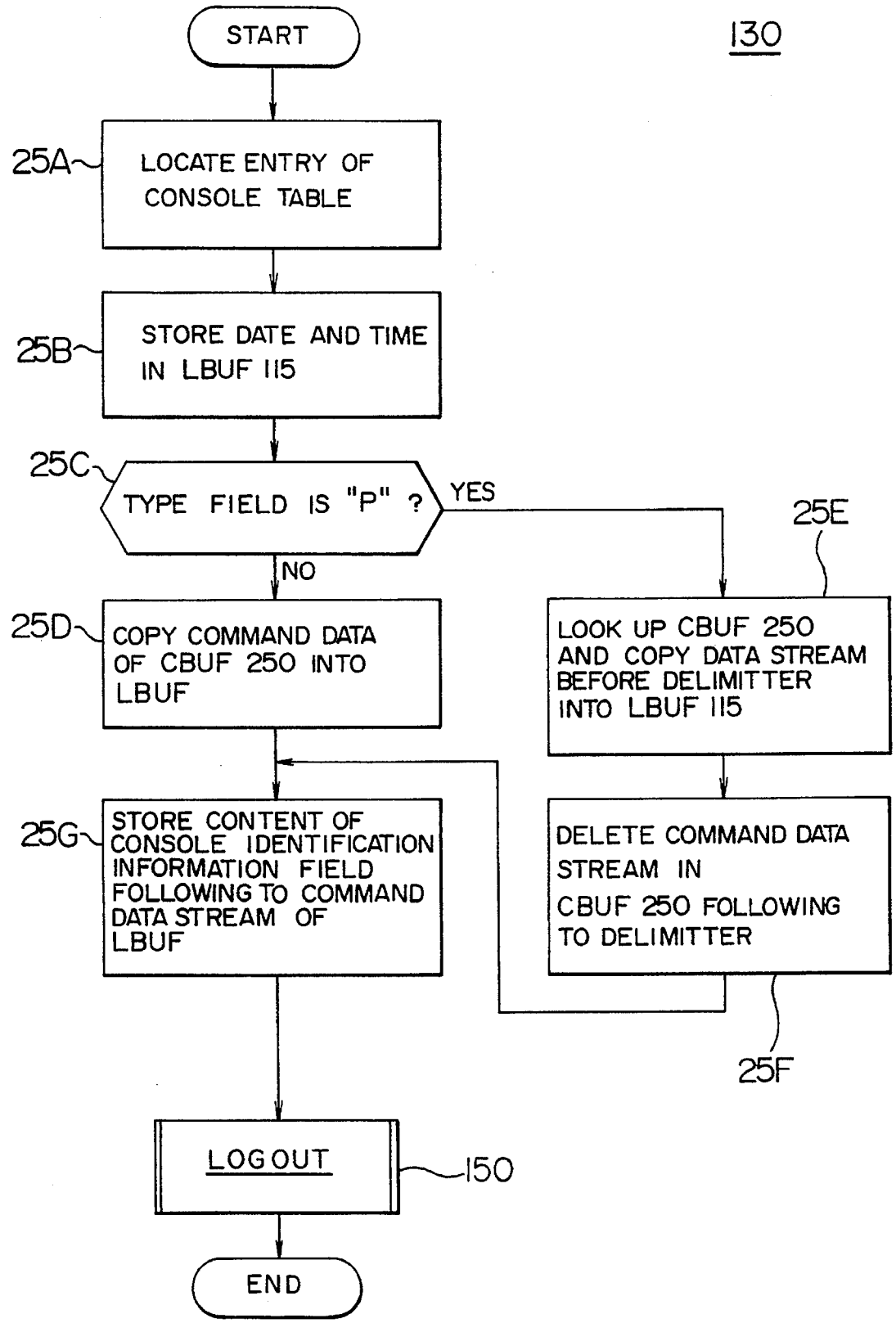
FIG. 8 shows a process flow of a receiving processor 130 of the command data.
Figure 9:
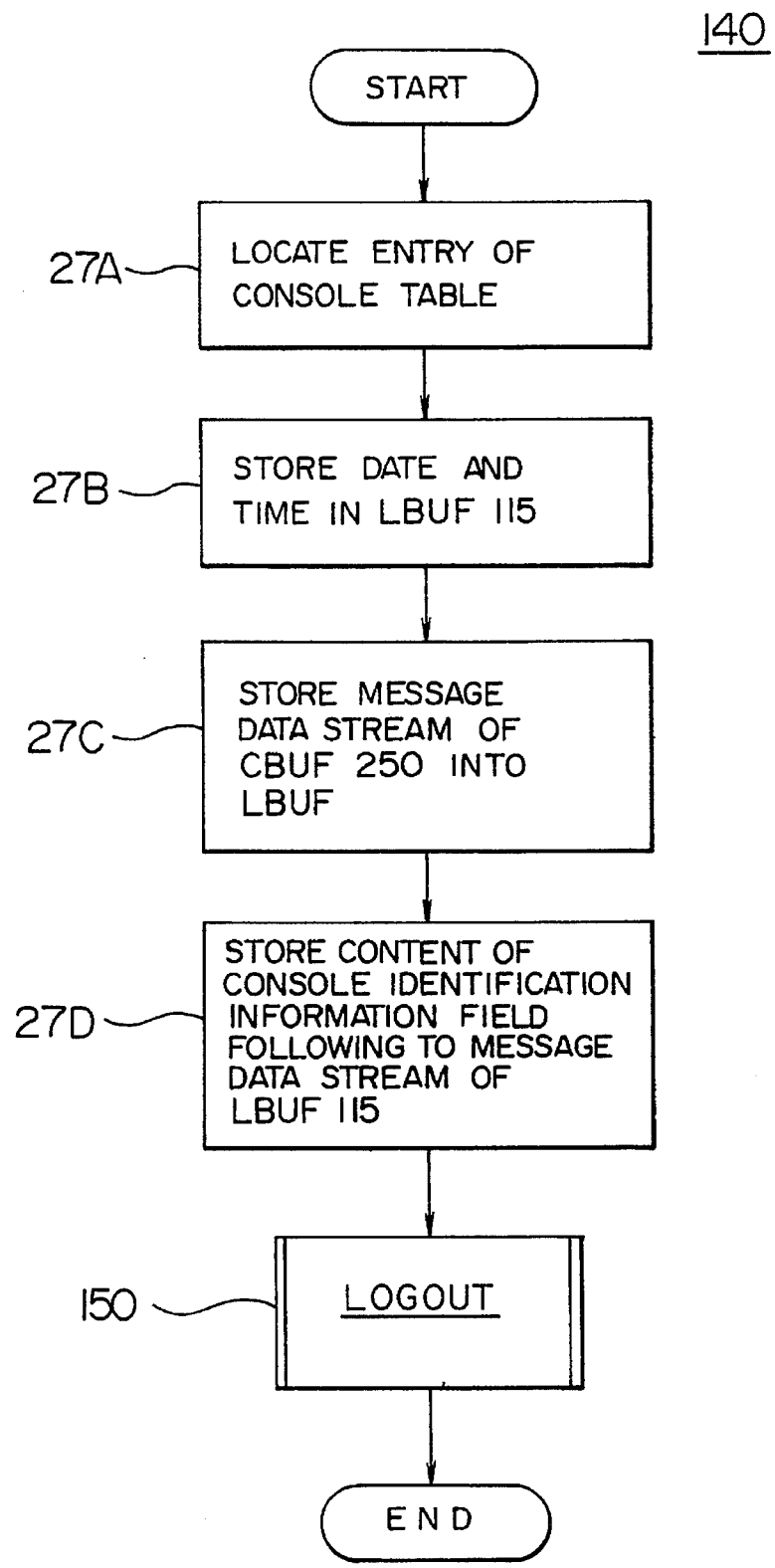
FIG. 9 shows a process flow of a message data sending processor 140.
Figure 10:
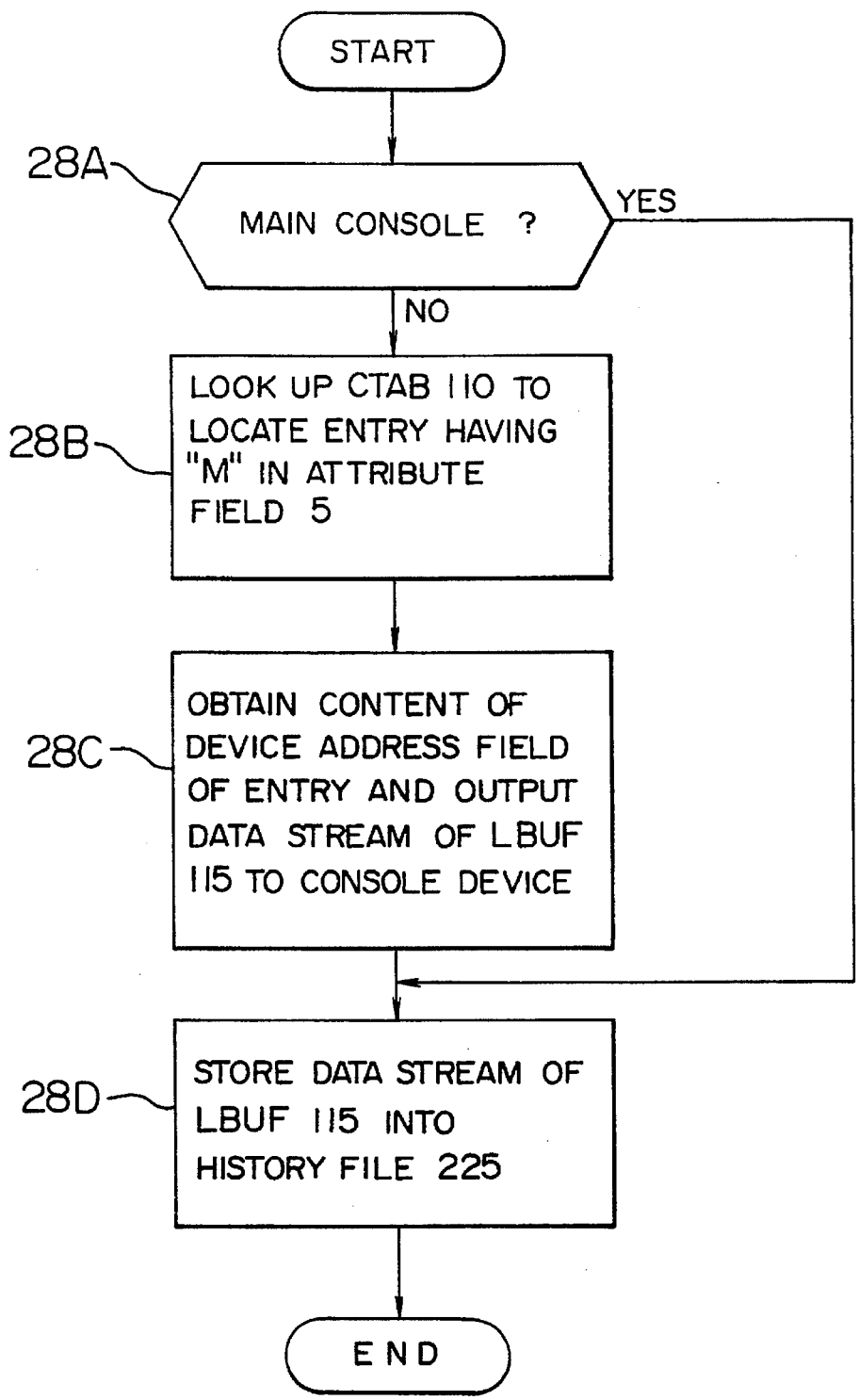
FIG. 10 shows a process flow of a logging processor 150 of the command/message data.
Figure 11:
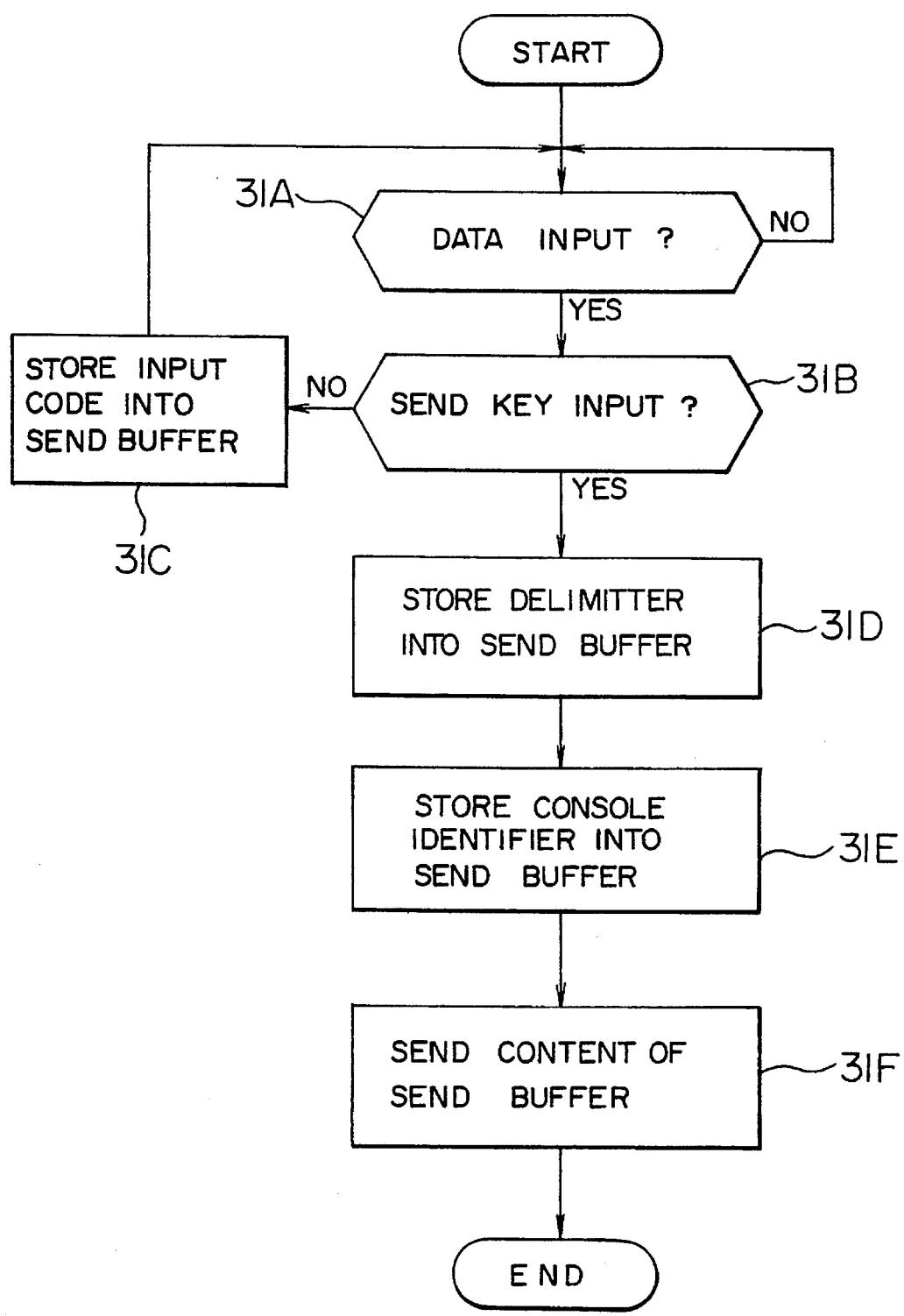
FIG. 11 shows a process flow when a delimitter is automatically added by the console device.

FIG. 2 shows the format of the console table (CTAB) 110 shown in FIG. 1, FIG. 3 shows a configuration of processing programs of the message router 100, FIGS. 4 and 5 show processes when the data stream of the command data is received from the console devices 201–205, FIG. 6 shows a process when the data stream of the message data is sent to the console devices 201–205, FIG. 7 shows a process flow of the message router main processor 120 of FIG. 3, FIG. 8 shows a process flow of the command data receiving processor 130, FIG. 9 shows a process flow of the message data sending processor 140, and FIG. 10 shows a process flow of the logging processor 150 for the command/message data. FIG. 11 shows a process flow when a delimiter is automatically added by the console device, and FIG. 12 shows a process flow of an edition output program 235 shown in FIG. 1.

The operation of the console control system of the information processing system of the present invention is first explained with reference to FIG. 1 and then details of the respective processors are explained with reference to FIG. 2 et seq.

Referring to FIG. 1, an operator of the computer system issues command data for controlling the computer system 200 through the console devices 201–205. The console device 201 is defined as a main console device and the console devices 202–205 are defined as auxiliary console devices. Those definition information are stored in the CTAB 110. When the command data is inputted from the auxiliary console device 203, the data stream of the command data is stored in the CBUF 250 and the control is shifted from the IOS 240 to the message router 100. The message router 100 looks up the CTAB 110 by using a device address of the console device as a search term to locate an entry corresponding to the console device. Thus, the attribute information such as identification information of the device is obtained. Then, the data and the time are stored in the LBUF 115 and the data stream of the command data in the CBUF 250 is transferred to the LBUF 115. Following to those data streams, the identification information of the console device obtained from the CTAB 110 is added.

Then, the content of the LBUF 115 is displayed on the main console device and it is stored in the auxiliary storage 225. When the command data is to be received from the main console device 201, the displaying of the content of the LBUF 115 on the main console device 201 is not effected. After the above processing, the control is shifted to the console input/output program 242, and the console input/output program 242 delivers the data stream of the command data in the CBUF 250 to a job control program 244 and a task control program 246, or an application program 237. If the LBUF 115 is not used in the above series of processes, the CBUF 250 is used, and the identification information is added behind the data stream of the command data in the CBUF 250 and it is displayed on the main console device and stored in the auxiliary storage 225. After those processes, the added identification information is removed from the CBUF 250 and it is delivered to the application program 237. Accordingly, the console control system of the present invention does not impede the operation of the prior art system.

The operation when the message data is sent is now explained. It is assumed that the message data is to be sent from the console input/output program 242 in the computer system 200 to the auxiliary console device 203. When a send request for the message data is issued from the job control program 244, the task control program 246 or the application program 237, the console input/output program 242 stores the data stream of the message data into the CBUF 250 and shifts the control to the message router 100. The message router 100 looks up the CTAB 110 by using the device address of the console device as a search term to locate the entry corresponding to the console device and obtain the attribute information such as the identification information relating to the device, as it does in the case of reception of the command data. Then, the data and time are stored in the LBUF 115 and the data stream of the command data in the CBUF 250 is copied into the LBUF 115. Following to the data stream, the identification information of the console device obtained from the CTAB 110 is added.

Then, the content of the LBUF 115 is displayed on the main console device and it is stored in the auxiliary storage 225. When the message data is to be sent to the main console device 201, the displaying of the content of the LBUF 115 on the main console device 201 is not effected. After the above process, the control is shifted to the IOS 240 and the message data in the CBUF 250 is displayed on the auxiliary console device 203. If the LBUF 115 is not used when the message data is sent, the identification information is added in the CBUF 250. In this case, the added identification information is removed before it is displayed on the auxiliary console device 203.

In the present control system, all communications of the command data/message data are displayed on the main console device 201, and the history of the communications of the command data/message data is stored in the auxiliary storage 225. The edition output program 235 edits the history of the command data/message data stored in the auxiliary storage 225 for each console device or sequentially, and outputs it to the output device such as a line printer 220.

Referring now to FIG. 2 et seq. the operation of the console control system of the information processing system of the present invention is explained in detail FIG. 2 shows a format of the console table CTAB 110 shown in FIG. 1. In the CTAB 110, numeral 1 denotes the number N of registered entries, numeral 2 denotes a device address field of the console device, numeral 3 denotes a nmemonic field or a device symbol name field, numeral 4 denotes a device type field, numeral 5 denotes a device attribute field, and numeral 6 denotes an identification information field of the console device. The device address field 2 contains the device address of the console device connected to the computer system 200. For example, the device address of the main console device 201 is "001", and the device address of the auxiliary console device 203 is "009". The nmemonic field 3 contains the symbol name of the console device. The type fields contains information which indicates whether the console device has the data processing capability of not. When the content of the type field is "N", it means that the data processing capability is not provide, and when it is "P", it means that the data processing capability is provided. The attribute field 5 contains an attribute value which indicates whether the console device is a main console device, an auxiliary console device or a remote console device. When it is "M", it means the main console device, when it is "S", it means an auxiliary console device, and when it is "R", it means a remote control device. The identification information field 6 contains an identification code or character data of the console device. The data stream of the identification information field 6 is added following to the command data and message data and it is displayed on the main console device and stored in the auxiliary storage 225. In FIG. 1, the main console device 201 corresponds to the entry of the device address "001", the auxiliary console device 203 corresponds to the entry of the device address "009", the auxiliary console device 202 corresponds to the entry of the device address "010", the remote console device 204 corresponds to the entry of the device address "040", and the remote console device 205 corresponds to the entry of the device address "041".

FIG. 3 shows a configuration of the message router 100 shown in FIG. 1. In FIG. 3, the CTAB 110 and the CBUF 250 shown in FIGS. 1 and 2 are also shown. Dotted line arrows in FIG. 3 mean the reference and updating of the table and buffer. The message router 100 comprises a message router main processor 110, a command data receiving processor 130, a message data sending processor 140 and a command/message data logging processor 150. When command data is to be received, the CTAB 110 is looked up by the message router main processor 120 to locate an entry which is equal to the device address of the console device which sent out the command data. A search word is not limited to the device address 2 of FIG. 2 but it may be nmemonic 3 or a symbol name of the device. Then, the content of the CBUF 250 is transferred to the LBUF 115 by the command data receiving processor 130 and the content of the identification information field 6 of the CTAB 110 is stored into the LBUF 115. The content of the LBUF 115 is displayed on the main console device 201 by the command/ message data logging processor 150 and it is also stored into the auxiliary storage 225.

On the other hand, when the message data is to be sent, the control is shifted from the console input/output program 242. The CTAB 110 is looked up by the message router main processor 120 to locate the entry corresponding to the device address of the console device under consideration. Then, the control is shifted to the message data sending processor 140. The message data sending processor 140 copies the content of the CBUF 250 into the LBUF 115 and stores the content of the identification information field 6 of the CTAB 110 into the LBUF 115. The command/message data logging processor 150 displays the content of the LBUF 115 on the main console device 201 and also stores it into the auxiliary storage 225. When the command data is to be received, a data stream "BY" is preceded to the data stream of the identification information 6, and when the message data is to be sent, a data stream "TO" is preceded to the data stream of the identification information 6. Details thereof will be explained with reference to FIG. 4 et seq.

FIGS. 4 and 5 show relationship between input and output of data in the processing of the command data receiving processor 130 when the data stream of the command data is inputted from the console devices 201–205. In FIG. 4, the data stream is inputted from the auxiliary console device 202, and in FIG. 5, it is inputted from the auxiliary console device 205. Further, in FIG. 4, the console device has no data processing function, and in FIG. 5, the console device has a data processing function.

When the command data is inputted from the console device 202 and the control is shifted from the IOS 240 to the message router main processor 120 and the corresponding entry of the CTAB 110 is located, the command data receiving processor 130 of FIG. 4 operates. First, it stores the current data 8A and the current time 8B into the LBUF 115. Then, the content of the CBUF 250 is copied into the LBUF 115. The data streams 7A–7C in the CBUF 250 are copied into positions shown by 7A1, 7B1 and 7C1 in the LBUF 115. A symbol A means a block character. Since the command data is to be received, a symbol "BY" 9 is added and then the content of the identification information field 6 of the console device 202, that is, "SUB-CON 1" 6B is stored. Then, the content of the LBUF 115 is displayed on the main console device 201 and it is also stored into the auxiliary storage 225 as the history information.

FIG. 5 shows the input processing of the command data when the console device 205 has a data processing function. Whether the console device has the data processing function or not is determined by examining the type field 4 of FIG. 2. If the content of the type field 4 is "P", it means that the console device has the data processing function. In this case, the processing in the command data receiving processor 130 does not include the delimitter 7D and the code train 7E of the CBUF 250 as opposed to the processing shown in FIG. 4.

FIG. 6 shows a relationship between input and output of data in the message data sending processor 140 when the message data is to be sent to the console devices 201–205. The control is shifted from the console input/output program 242 to the message router main processor 120 and the corresponding entry of the CTAB 110 is located. Then, the message data sending processor 140 operates. First, it stores the current data 12A and the current time 12B into the LBUF 115. When, it copies the content of the CBUF 250 into the LBUF 115. The character stream of the message data 11 in the CBUF 250 is copied into the position 12C shown in the LBUF 115. A symbol A indicates a blank character. Since the message data is to be sent, the code "TO" 12D is added and then the content of the identification information field 6 of the corresponding console device 202, that is, "SUB-CON'" 6B is stored. It is shown by 12E in the LBUF 115. Then, the content of the LBUF 115 is displayed on the main console device 201 and it is also stored into the auxiliary storage 225 as the history information.

The operation of the message router 100 is now explained with reference to the flow charts of FIG. 7 et seq. FIG. 7 shows a process flow of the message router main processor of FIG. 3, FIG. 8 shows a process flow of the command data receiving processor 130, FIG. 9 shows a process flow of the message data sending processor 140, and FIG. 10 shows a process flow of the command/message data logging processor 150. FIG. 11 shows a process flow when a delimitter is automatically added by the console device, and FIG. 12 shows a process flow of the edition output program 235 shown in FIG. 1.

The operation of the reception of the command data is first explained. Referring to FIG. 7, when the command data is to be received, the steps 16B–22B of the message router main processor 120 are carried out. In the step 17B, a variable REQ is set to "IN". The variable REQ is an internal work variable. In the step 18, the console table CTAB 110 is looked up to locate the device address of the console device. As result, the entry which is equal to the device address of the console device is located. In looking up the CTAB 110, the symbol name of the device may be used as the search word.

In the step 29, the branching is made at the variable REQ. Since the command data is to be received, the steps 20B–22B are carried out. First, the control is shifted to the command data receiving processor 130 and the processing shown in FIGS. 4 and 5 is executed.

FIG. 8 shows a process flow of the command data receiving processor 130. In the step 25A, the entry in the CTAB 110 is located. In the step 25B, the current data and the current time are stored into the LBUF 115. In the decision step 25C, the content of the type field 4 of the entry of the CTAB 110 is examined. If the content of the type field 4 is "P", it means that the console device has the data processing function, and the steps 25E and 25F are executed, and then the step 25G is executed. Since the command data stream shown in FIG. 5 has been stored in the CBUF 250, the data stream in front of the delimitter 7D of FIG. 5 is copied into the LBUF 115. In the present embodiment, the symbol ":" is used as the delimitter although it is not restrictive. In the step 25F, the data stream after the delimitter 7D in the CBUF 250 is deleted. In this manner, the same interface as that for the existing system may be maintained for the job control program 244, the task control program 246 or the application program 237. The data 7E following to the delimitter 7D is the identifier generated by the console device. The identifier 7E and the content of the identification information field 6 may be equal. In the present embodiment, it is assumed that they are different.

On the other hand, in the decision step 25C, if the value of the type field 4 is not "P", the step 25D is executed and then the step 25G is executed. In the step 25G, the command data stream in the CBUF 250 is copied into a predetermined position in the LBUF 115.

Then, in the step 25G, the content of the identification information field 6 shown in FIG. 2 is stored. In the example of FIGS. 4 and 5, the value "SUB-CONT" 6B is stored. When the above processing is over, the control is shifted to the command/message data logging output processor 150 (LOGOUT in FIG. 8).

FIG. 10 shows a process flow of the command/message data logging output processor 150. Referring to FIG. 10, in the decision step 28A, whether the console device is a main console device or not is examined. This is done by checking the content of the attribute field 5. If it is "M", it means that the console device is the main console device and the steps 28B and 28C are skipped and the step 28D is executed.

On the other hand, if the content is not "M", the steps 28B and 28C are executed. In those steps, the content of the LBUF 115 is displayed on the main console device 201. In the step 28B, the CTAB 110 is looked up to locate the device address 2A of the main console device. In the step 28C, the content of the LBUF 115 is displayed on the main console device having the device address 2A. In the step 28D, the data stream of the LBUF 115 is stored in to the history file 225.

When the above processing is over, the control is returned to the step 21B of FIG. 7. In the step 21B, the variable REQ is set to "NULL", and the control is shifted to the console input/output program 242 through the step 22B. The console input/output program 242 handles the CBUF 110.

In the above embodiment, the LBUF 115 is used as a work area. Alternatively, only the console buffer CBUF 50 may be used to add the identification information 6. In this case, the code 9 and the identification information 6B are stored following to the command data streams 7A–7C of the CBUF 250 of FIG. 4. Then, the content of the CBUF 250 is displayed on the main console device 201 and stored into the auxiliary storage 225. Accordingly, when the command data streams 7A–7C are to be delivered to the job control program 244, the task control program 246 or the application program 237, the data streams 9 and 6B previously stored are deleted from the CBUF 250.

The operation of sending the message data is now explained. With reference to FIG. 7, when the message data is to be sent, the steps 16A–22A of the message router main processor 120 are executed. In the step 16A, the control is shifted from the console input/output program 242. In the step 17A, the variable REQ is set to "OUT". In the step 18, the entry in the CATB 110 corresponding to the console device to which the message data is to be sent in located.

In the step 19, since the message data is to be sent, the control is shifted to the step 20A. The control is shifted to the message data sending processor 140 and the process shown in FIG. 6 is executed.

FIG. 9 shows a process flow of the message data sending processor 140. In the step 27A, the entry in the CTAB 110 is located. In the step 27B, the current data and the current time are stored into the LBUF 115. In the step 27C, the message data 11 in the CBUF 110 of FIG. 6 is copied into the LBUF 115. In the step 27D, the content of the identification information field 6 shown in FIG. 2 is stored. In the example of FIG. 6, "SUB-CONI" 6b is stored. When the above processing is over, the control is shifted to the command/message data logging output processor 150, and the content of the LBUF 115 is displayed on the main console device and it is also stored into the auxiliary storage 225 as the history information. The process flow of the command/message data logging output processor 150 of FIG. 10 is same as that for the reception of the command data and hence the explanation thereof is omitted.

When the above processing is over, the control is returned to the step 21A of FIG. 7. In the step 21A, the variable REQ is set to "NULL", and the control is shifted to the IOS 240 through the step 22A. The IOS 240 displays the content of the CBUF 250 on the console device.

In sending the message data, the LBUF 115 is used as a work area. Alternatively, only the console buffer CBUF 250 may be used to add the identification information 6. In this case, the code 12D and the identification information 12E are stored following to the message data stream 11 of the CBUF 250 of FIG. 6. Then, the content of the CBUF 250 is displayed on the main console device 201 and stored in the auxiliary storage 225. Accordingly, when the message data is to be displayed on the corresponding auxiliary console device, the data streams 12D and 12E previously stored are deleted from the CBUF 250.

The receipt of the command data and the send of the message data have been described. In the disclosed embodiment, the history of the command data and the message data is stored in the auxiliary storage shown in FIG. 1. Alternatively, it may be stored in an auxiliary storage (not shown) connected to the main console device 201 by the main console device 201. In this case, when the command/message data logging processor 150 of the message router 100 sends the command data or message data together with the identification information 6 to the main console device 201, the data may be stored in the auxiliary storage. Accordingly, the location to store the history of the command data and message data is not limited to the auxiliary storage 225 of the computer system 200.

Referring now to FIG. 11, the operation of the console device having the data processing function is explained. FIG. 11 shows an operation flow of the auxiliary console devices 202 and 205 when the delimiter is automatically added by the console device. The operation of FIG. 11 is applicable to the console device having the data processing function, that is, the console device having "P" in the type field 4 of FIG. 2. Referring to FIG. 11, in the step 31A, the input of the character data is monitored, and when the character data is inputted, whether it is the send key, that is, send character or not is determined in the devision step 31B. If it is not the send key, the character code inputted in the send buffer in its own console device is stored in the step 31C.

On the other hand, if it is the send key, the steps 31D-31F are executed. In the step 31D, the delimiter 7D shown in FIG. 5 is stored into the send buffer in its own console device. In the step 31E, the identifier 7E is stored into the send buffer. In the step 31F, the content of the send buffer in its own console device is transferred to the computer system 200. In this manner, the data stream shown in FIG. 5 is stored in the CBUF 250 of the computer system 200.

FIG. 12 shows a process flow of the edition output program 235 shown in FIG. 1. In the step 32A, the form of the edition output is given by a parameter. In the step 32, the branching is made to a requested edition form. If it is a time-serial edition, the steps 33-35 are executed, and if it is the console device designation, the steps 36-37 are executed. Namely, if it is the time-serial edition, the command/message having the dates and the times within the edition range are read from the auxiliary storage 225 and they are outputted in the time sequence.

On the other hand, if it is the console device designation, only the command/message of the console device having the data and the time within the edition range are read from the auxiliary storage 225 and they are outputted in the time sequence. In FIG. 12, the edition of only two types is disclosed but various edition outputs may be produced by adding the steps corresponding to the edition form.

In accordance with the present invention, the control mechanism 100 which monitors and collects the history of the console operation to the information processing system is provided between the information processing system or the processing program in the computer system and the console devices to always monitor the command data and the message data to and from the computer system. Each time the send or receipt of the command data or the message data takes place, the identification information of the console device is automatically added and it is displayed on the main console device and stored in the auxiliary storage as the history information. Accordingly, when command data are randomly inputted from a plurality of console devices, the main console device can always and immediately determine what command data have been inputted from what console devices.

Further, since the history of the send and receipt of the command data and the message data are stored in the auxiliary storage together with the identification information of the console device, a factor of the obstacle of the computer system due to the misoperation of the console device can be immediately analyzed.

What is claimed is:

1. A method for monitoring communication between at least one computer and a plurality of console devices connected thereto and comprised of a main console device add a plurality of sub-console devices, the method comprising the steps of:

responsive to issuing of command data from one of said sub-console devices to the computer, storing combined data including the command data and identifying information which can be used to identify said one sub-console device from others of said console devices as part of history information on communication between the computer and the console devices; and, displaying the combined data on the main console device.

2. A method according to claim 1, further comprising the step of:

selecting, as the identifying information, one identifying information predetermined for said one sub-console device, among a plurality of identifying information each predetermined for a corresponding one of the console devices.

3. A method according to claim 1, further comprising the step of:

receiving the identification information from the one sub-console device together with the command data.

4. A method according to claim 1, further comprising the steps of:

receiving identification information predetermined for the one sub-console device therefrom together with the command data; and generating the identifying information from said received identification information.

5. A method according to claim 1, wherein at least one of said sub-console devices has means for generating identification information which can be used to identify said one sub-console device from others of the console devices;

the method further comprising the steps of:

receiving identification information from said one sub-console device when said one sub-console device has sent the identification information together with the command data;

generating the identifying information for said one sub-console device from said received identification information; and selecting one identifying information predetermined for said one sub-console device among a plurality of identifying information each predetermined for one of said console devices, in case no identification information has been received from said one sub-console device.

6. A method for monitoring communication between at least one computer and a plurality of console devices connected thereto and comprised of a main console device and a plurality of sub-console devices, the method comprising the steps of:

responsive to issuing by said computer message data to be sent to one of said sub-console devices, storing combined data including the message data and identifying information which can be used to identify said one sub-console device from others of the console devices as part of history information on communication between the computer and the console devices; and displaying the combined data on the main console device.

7. A console control method according to claim 6, further comprising the step of:

selecting, as the identifying information, one identifying information predetermined for said one sub-console device, among a plurality of identifying information each predetermined for a corresponding one of the console devices.

8. A method according to claim 6, further comprising the steps of:

receiving message data sent to one of the console devices from the computer;

executing the storing step for the received message data either when the one console device is either one of the sub-console devices or the main console device;

executing the displaying step for the received message data when the one console device is one of the sub-console devices; and inhibiting execution of the displaying step for the received message data when the one console device is the main console device.

9. A method according to claim 8, further comprising the step of:

detecting whether the one console device to which the received message data is sent is one of the sub-console devices or said main console device, based upon a plurality of attributes each predetermined for a corresponding one of said console devices and each indicative of whether a corresponding console device is a main console device or a sub-console device.

10. A system for monitoring communication between a computer and a plurality of console devices, comprising:

a main console device included in said console devices and connected to said computer;

a plurality of sub-console devices included in said console devices connected to said computer;

first storage means for holding history information on communication between said computer and said console devices;

storing means connected to said console devices and said first storage means and responsive to issuing of command data from one of said sub-console devices to said computer for storing combined data into said first storage means, as part of the history information, the combined data including the command data and identifying information which can be used to identify said one sub-console device from others of said control devices; and means connected to said console devices for displaying the combined data on the main console device.

11. A system according to claim 10, further comprising:

second storage means for holding a plurality of identifying information each predetermined for a corresponding one of the console devices; and means connected to said second storage means and said storing means and responsive to the issuing of the command data for selecting, as the identifying information, one identifying information predetermined for said one sub-console device, among the plurality of identifying information held in said second storage means.

12. A system according to claim 10, further comprising:

means connected to the console devices for receiving command data from one of the console devices; and means connected to said receiving means for executing the storing step for the received command data when the one console device is either one of the sub-console devices or the main console device, for executing the displaying step for the received command data when the one console device is one of the sub-console devices; and for prohibiting execution of the displaying step for the received command data when the one console device is the main console device.

13. A system according to claim 12, further comprising:

means connected to said console devices for detecting whether the one console device which has issued the command data is one of the sub-console devices or said main console device, based upon a plurality of attributes each predetermined for a corresponding one of said console devices and each indicative of whether a corresponding console device is a main console device or a sub-console device.

14. A system according to claim 10, further comprising:

means connected to said console devices for receiving the identification information from the one sub-console device together with the command data.

15. A system according to claim 10, further comprising:

means connected to said console devices for receiving identification information from the one sub-console device together with the command data; and means for generating the identifying information from said received identification information.

16. A system according to claim 10, wherein at least one of said sub-console devices has means for generating identifying information which can be used to identify said one sub-console device from others of the console devices;

the system further comprising:

means connected to said console devices for receiving identification information from said one sub-console device when said one sub-console device has sent the identification information together with the command data;

means for generating the identifying information for said one sub-console device from said received identification information; and means for selecting one identifying information predetermined for said one sub-console device among a plurality of identifying information each predetermined for one of said console devices, in case no identification information has been received from said one sub-console device.

17. A system according to claim 10, further comprising:

means connected to said computer for receiving message data sent to one of the console devices from the computer;

means for executing the storing step for the receiving message data either when the one console device is either one of the sub-console devices or the main console device; and means for executing the displaying step for the received message data when the one console device is one of the sub-console devices and for inhibiting execution of the displaying step for the received message data when the one console device is the main console device.

18. A system according to claim 17, further comprising:

means for detecting whether the one console device to which the received message data is sent is one of the sub-console devices or said main console device, based upon a plurality of attributes each predetermined for a corresponding one of said console devices and each indicative of whether a corresponding console device is a main console device or a sub-console device.

19. A system for monitoring communication between a computer and a plurality of console devices, comprising:

a main console device included in said console devices and connected to said computer;

a plurality of sub-console devices included in said console devices and connected to said computer;

first storage means for holding history information on communication between the computer and the console devices;

storing means connected to said console devices and said first storage means and responsive to issuing by said computer, of message data to be sent to one of said sub-console devices for storing combined data including the issued message data and identifying information which can be used to identify said one sub-console device from others of said console devices into said storage means, as part of the history information; and means connected to said console devices for displaying the combined data on the main console device.

20. A system according to claim 19, further comprising:

second storage means for holding a plurality of identifying information each predetermined for a corresponding one of the console devices; and selecting means connected to said console devices and said second storage means and responsive to the issuing of the message data for selecting, as the identifying information, one identifying information predetermined for said one sub-console device, among the plurality of identifying information held in said second storage means and for supplying the selected identifying information to said storing means.

21. An information processing system including:

at least one computer; and a plurality of console devices connected to said computer, wherein at least one of said console devices includes;

means responsive to inputting by an operator, of command data to be transferred to the computer for adding identification information of the console device to the command data, and means for transferring the command data and the identifying information to the computer.

22. A method according to claim 1, further comprising the steps of:

receiving command data from one of the console devices;

executing the storing step for the received command data when the one console device is either one of the sub-console devices or the main console device;

executing the displaying step for the received command data when the one console device is one of the sub-console devices; and inhibiting execution of the displaying step for the received command data when the one console device is the main console device.

23. A method according to claim 22, further comprising the step of:

detecting whether the one console device which has issued the command data is one of the sub-console devices or the main console device, based upon a plurality of attributes each predetermined for a corresponding one of said console devices and each indicative of whether a corresponding console device is a main console device or a sub-console device.

24. A method for monitoring communication between a computer and a plurality of console devices connected thereto and comprised of a main console device and a plurality of sub-console devices, the method comprising the steps of:

displaying first combined data on said main console device, in response to issuing of command data from one of said sub-console devices to said computer, said first combined data being comprised of said command data and identifying information which is predetermined for said one sub-console device and which can be used to identify said one sub-console device from others of said sub-console devices; and displaying second combined data on said main console device, in response to issuing by said computer, of message data to one of said sub-console devices, said second combined data being comprised of said message data and identifying information which is predetermined for said one sub-console device and which can be used to identify said one sub-console device from others of said sub-console devices.

25. A method for monitoring communication between a computer and a plurality of console devices connected thereto, the method comprising the steps of:

storing first combined data, as part of history information on communication between the computer and the console devices, in response to issuing of command data from one of said console devices to said computer, said first combined data being comprised of said command data and identifying information which is predetermined for said one console device and which can be used to identify said one console device from others of said console devices;

storing second combined data, as part of the history information in response to issuing by said computer, of message data to one of said console devices, said second combined data being comprised of said message data and identifying information which is predetermined for said one console device and which can be used to identify said one console device from others of said console devices; and selectively reading out part of the stored history information in response to designation of one identifying information, the part including a series of combined data each including identifying information which is coincident with the designated identifying information and either one of command data and message data.

26. A method for monitoring communication between a computer and a plurality of console devices connected thereto and comprised of a main console device and a plurality of sub-console devices, the method comprising the steps of:

displaying first combined data on said main console device, in response to issuing of command data from one of said sub-console devices to said computer, said first combined data being comprised of said command data and identifying information which is predetermined for said one sub-console device and which can be used to identify said one sub-console device from others of said sub-console devices;

storing said first combined data, as part of history information on communication between the computer and the console devices;

displaying second combined data on said main console device, in response to issuing by said computer, of message data to one of said sub-console devices, said second combined data being comprised of said message data and identifying information which is predetermined for said one sub-console device and which can be used to identify said one sub-console device and which can be used to identify said one sub-console device from others of said sub-console devices; and storing the second combined data, as part of the history information.

27. A method according to claim 26, further comprising the step of:

selectively reading out part of the stored history information in response to designation of one identifying information, the part including a series of combined data each including identifying information which is coincident with the designated identifying information and either one of command data and message data.

* * * * *